US007974446B2

(12) United States Patent
Fujiwara

(10) Patent No.: US 7,974,446 B2
(45) Date of Patent: Jul. 5, 2011

(54) FACE AUTHENTICATION SYSTEM AND FACE AUTHENTICATION METHOD

(75) Inventor: Koji Fujiwara, Mishima-gun (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1043 days.

(21) Appl. No.: 11/821,826

(22) Filed: Jun. 26, 2007

(65) Prior Publication Data

US 2008/0002866 A1 Jan. 3, 2008

(30) Foreign Application Priority Data

Jun. 29, 2006 (JP) ................................. 2006-180297

(51) Int. Cl.
*G06K 9/00* (2006.01)

(52) U.S. Cl. ........................................ 382/118; 348/142

(58) Field of Classification Search .......... 382/115–118, 382/294; 348/142
See application file for complete search history.

(56) References Cited

U.S. PATENT DOCUMENTS

| | | | |
|---|---|---|---|
| 5,859,921 A * | 1/1999 | Suzuki ........................... | 382/118 |
| 6,556,196 B1 * | 4/2003 | Blanz et al. .................... | 345/419 |
| 6,738,516 B1 | 5/2004 | Kondo et al. .................. | 382/190 |
| 7,693,304 B2 * | 4/2010 | Obrador ......................... | 382/112 |
| 2003/0123713 A1 * | 7/2003 | Geng .............................. | 382/118 |
| 2004/0068669 A1 * | 4/2004 | Uchida .......................... | 713/202 |
| 2004/0086157 A1 * | 5/2004 | Sukegawa ....................... | 382/115 |
| 2005/0117783 A1 * | 6/2005 | Sung et al. ..................... | 382/118 |
| 2005/0244033 A1 * | 11/2005 | Ekin et al. ..................... | 382/103 |
| 2006/0018517 A1 * | 1/2006 | Chen et al. .................... | 382/115 |
| 2006/0110029 A1 * | 5/2006 | Kazui et al. ................... | 382/159 |
| 2006/0204053 A1 * | 9/2006 | Mori et al. ..................... | 382/118 |
| 2006/0204057 A1 * | 9/2006 | Steinberg ....................... | 382/118 |
| 2006/0257050 A1 * | 11/2006 | Obrador ......................... | 382/286 |
| 2007/0098230 A1 * | 5/2007 | Norita et al. ................... | 382/118 |
| 2008/0159383 A1 * | 7/2008 | Kukreja et al. ........... | 375/240.01 |
| 2008/0175448 A1 * | 7/2008 | Fujiwara et al. .............. | 382/118 |

FOREIGN PATENT DOCUMENTS

| | | |
|---|---|---|
| JP | 2000-76460 A | 3/2000 |
| JP | 2004-126738 A | 4/2004 |

* cited by examiner

*Primary Examiner* — Samir A Ahmed
*Assistant Examiner* — Jayesh Patel
(74) *Attorney, Agent, or Firm* — Sidley Austin LLP

(57) ABSTRACT

A face authentication system includes a data input section for obtaining three-dimensional data concerning a face area of a subject at multiple points, and a processor for performing a registration process or a verification process of authentication data of the subject based on the three-dimensional data. The processor has a quality rater for rating a quality of the three-dimensional data with respect to each of the points of the three-dimensional data to generate quality data, and a quality distribution deriving section for deriving a distribution of the quality with respect to the face area, based on the quality data.

12 Claims, 15 Drawing Sheets

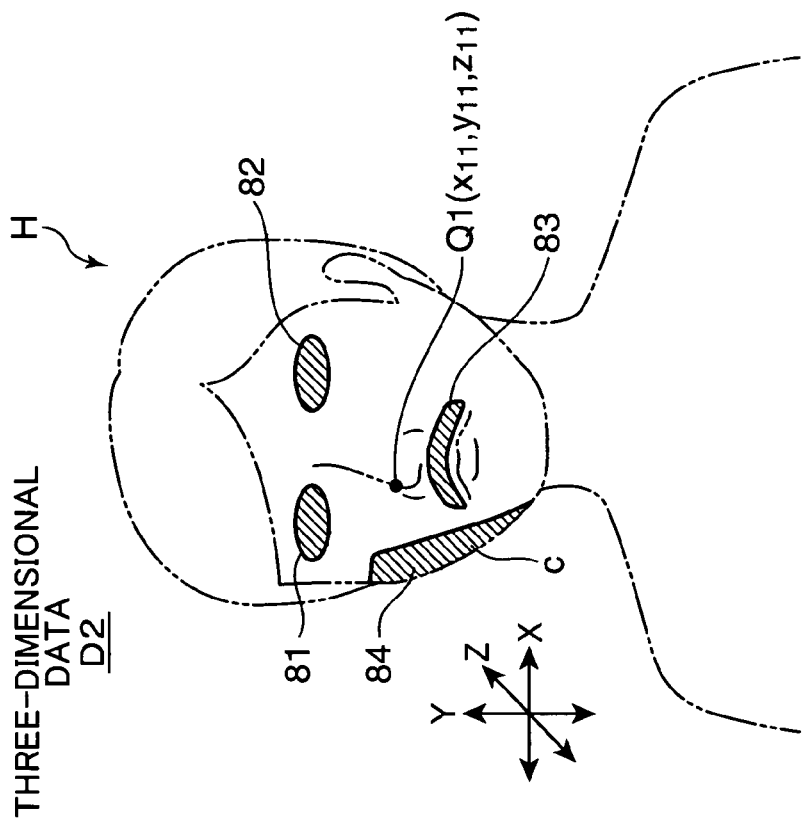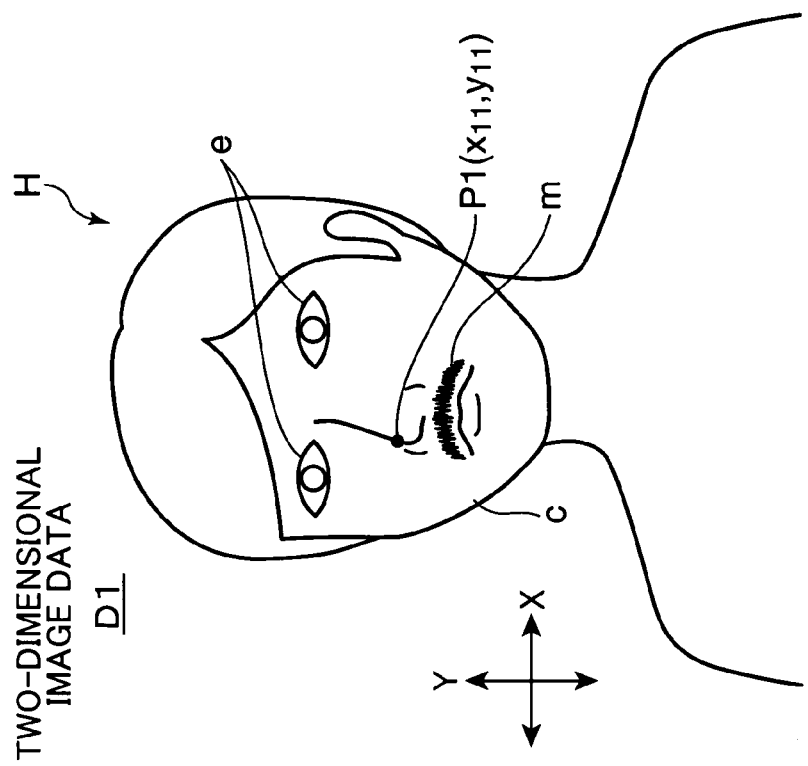

FACE AUTHENTICATION SYSTEM AND FACE AUTHENTICATION METHOD

This application is based on Japanese Patent Application No. 2006-180297 filed on Jun. 29, 2006, the contents of which are hereby incorporated by reference.

BACKGROUND OF THE INVENTION

1. Field of the Invention

The present invention relates to a face authentication system and a face authentication method for performing a registration process and a verification process of authentication data, and the like, based on three-dimensional data relating to a face area of a human.

2. Description of Related Art

Heretofore, there have been proposed various biometrics methods, using two-dimensional image data concerning a face area of a human. For instance, there is known a method comprising: pre-registering image information after acquiring a two-dimensional image including a face area of a person (hereinafter, also called as "subject") whose authentication is required, and specifying the face area by matching the acquired two-dimensional image with a predetermined face template; and comparing an image relating to the face area acquired in authentication with the registered image in feature quantity.

Japanese Unexamined Patent Publication No. 2004-126738 proposes a biometrics method for performing personal authentication, with use of a three-dimensional shape measuring apparatus for acquiring three-dimensional data concerning a face area of a subject, in addition to an image sensing apparatus for acquiring two-dimensional image data, by referring to the acquired two-dimensional image data and three-dimensional data. With use of the method, an authentication process can be performed, with the three-dimensional feature quantity relating to the face area being included, whereby more accurate and efficient authentication is executable. Japanese Unexamined Patent Publication No. 2000-76460 discloses a technique of displaying a three-dimensional data missing area on a two-dimensional image, in acquiring two-dimensional image data and three-dimensional data concerning a subject.

It is highly likely that a part of three-dimensional data may be missing depending on a face orientation of a subject or a like factor in acquiring the three-dimensional data relating to a face area of the subject. Three-dimensional data is measured by e.g. a method of projecting pattern light onto a subject and receiving light reflected on the subject. If the face of the subject does not face forward with respect to an imaging optical system of the image sensing apparatus, the three-dimensional shape measuring apparatus fails to receive a sufficient amount of light reflected on a sharply inclined part of the face area e.g. a cheek or its vicinity. In such a case, the image area having the insufficient light receiving amount may result in a data missing part.

If the template of the subject is registered in a state that the data missing part is included, the authentication precision may be lowered. In view of this, it is desirable to rate the quality of three-dimensional data acquired in the registration. The same idea is also applied to three-dimensional data to be acquired in the verification. Simply calculating a ratio of the three-dimensional data missing part relative to the face area is insufficient to rate the quality of the three-dimensional data. This is because, by the simple calculation of the ratio of the three-dimensional data missing part, it is difficult or impossible to determine whether the data is missing due to an improper face orientation or the like, or based on an improper photographing condition or a like condition e.g. a poor illumination condition or existence of an obstacle which may block the subject in image shooting.

SUMMARY OF THE INVENTION

In view of the above problems residing in the conventional examples, it is an object of the present invention to provide a face authentication system and a face authentication method that enable to accurately rate the quality of three-dimensional data in registering or verifying the three-dimensional data.

A face authentication system according to an aspect of the invention includes a data input section for obtaining three-dimensional data concerning a face area of a subject at multiple points, and a processor for performing a registration process or a verification process of authentication data of the subject based on the three-dimensional data. The processor has a quality rater for rating a quality of the three-dimensional data with respect to each of the points of the three-dimensional data to generate quality data, and a quality distribution deriving section for deriving a distribution of the quality with respect to the face area, based on the quality data.

These and other objects, features and advantages of the present invention will become more apparent upon reading the following detailed description along with the accompanying drawing.

BRIEF DESCRIPTION OF THE DRAWINGS

FIGS. 6A and 6B are diagrams showing an example of two-dimensional image data and three-dimensional data concerning a subject whose authentication is required.

DETAILED DESCRIPTION OF THE PREFERRED EMBODIMENTS

Figure 1:
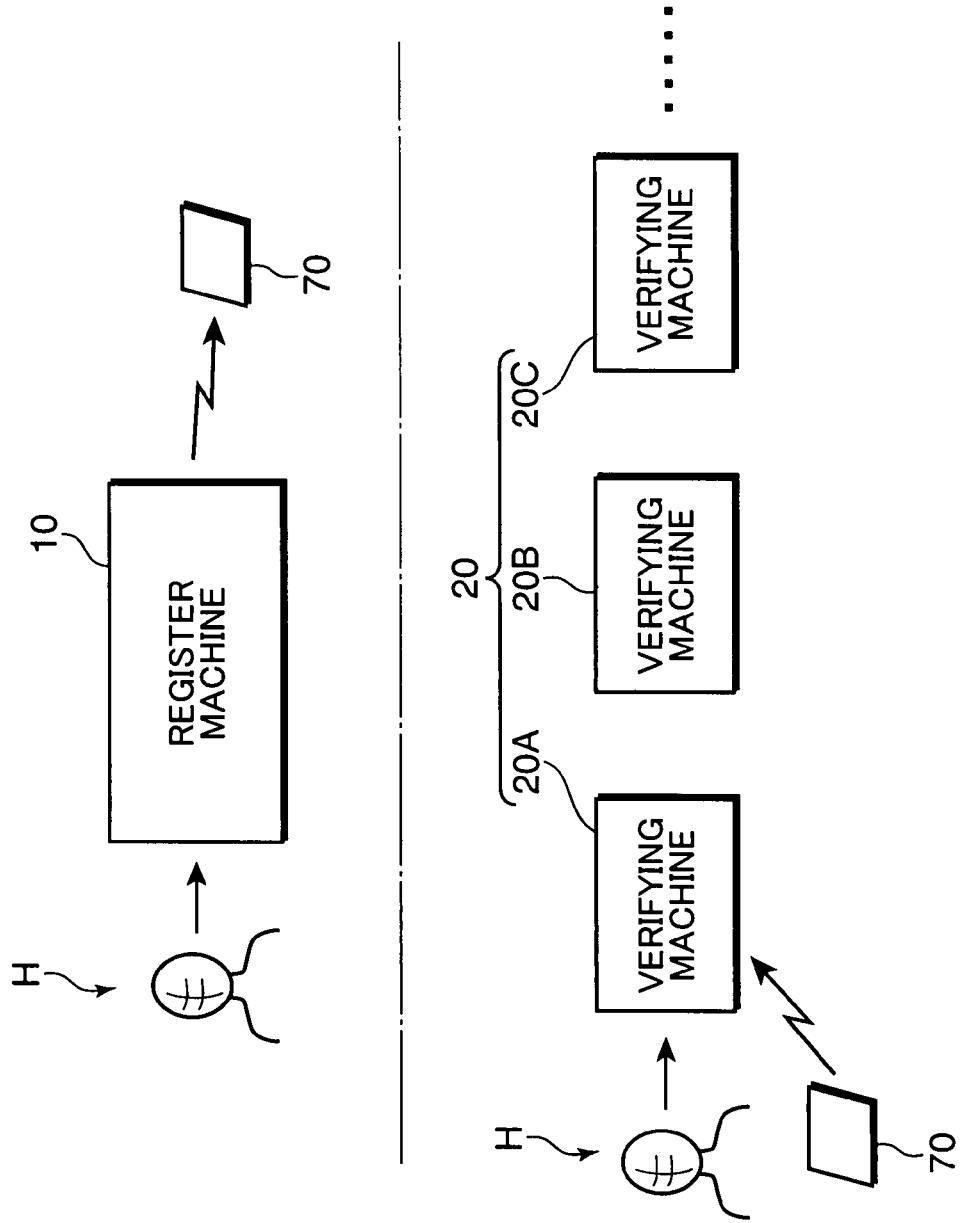
FIG. 1 is a block diagram showing a schematic arrangement of a face authentication system embodying the invention.

In the following, an embodiment of the invention is described in detail referring to the drawings. FIG. 1 is a block diagram showing a schematic arrangement of a face authentication system embodying the invention. The face authentication system includes a register machine 10 for performing a process of writing i.e. registering authentication data of a subject H whose authentication is required into an IC card 70, and a verifying machine group 20 i.e. verifying machines 20A, 20B, 20C, ... for performing a verification process of the subject H by reading the verification data recorded in the IC card 70.

An example of using the face authentication system is as follows. The register machine 10 is installed in a core center such as an administration bureau, and the verifying machines 20A, 20B, 20C, ... are installed in branch centers serving as access points. The subject H registers three-dimensional data concerning his or her face, which serves as authentication data for authenticating the subject H, into the IC card 70, with use of the register machine 10. The subject H carries the registered IC card 70, and acquires access permission, using the IC card 70 by performing a verification process with respect to one of the verifying machine group 20 installed in the branch center to which the subject H intends to access.

Figure 2:
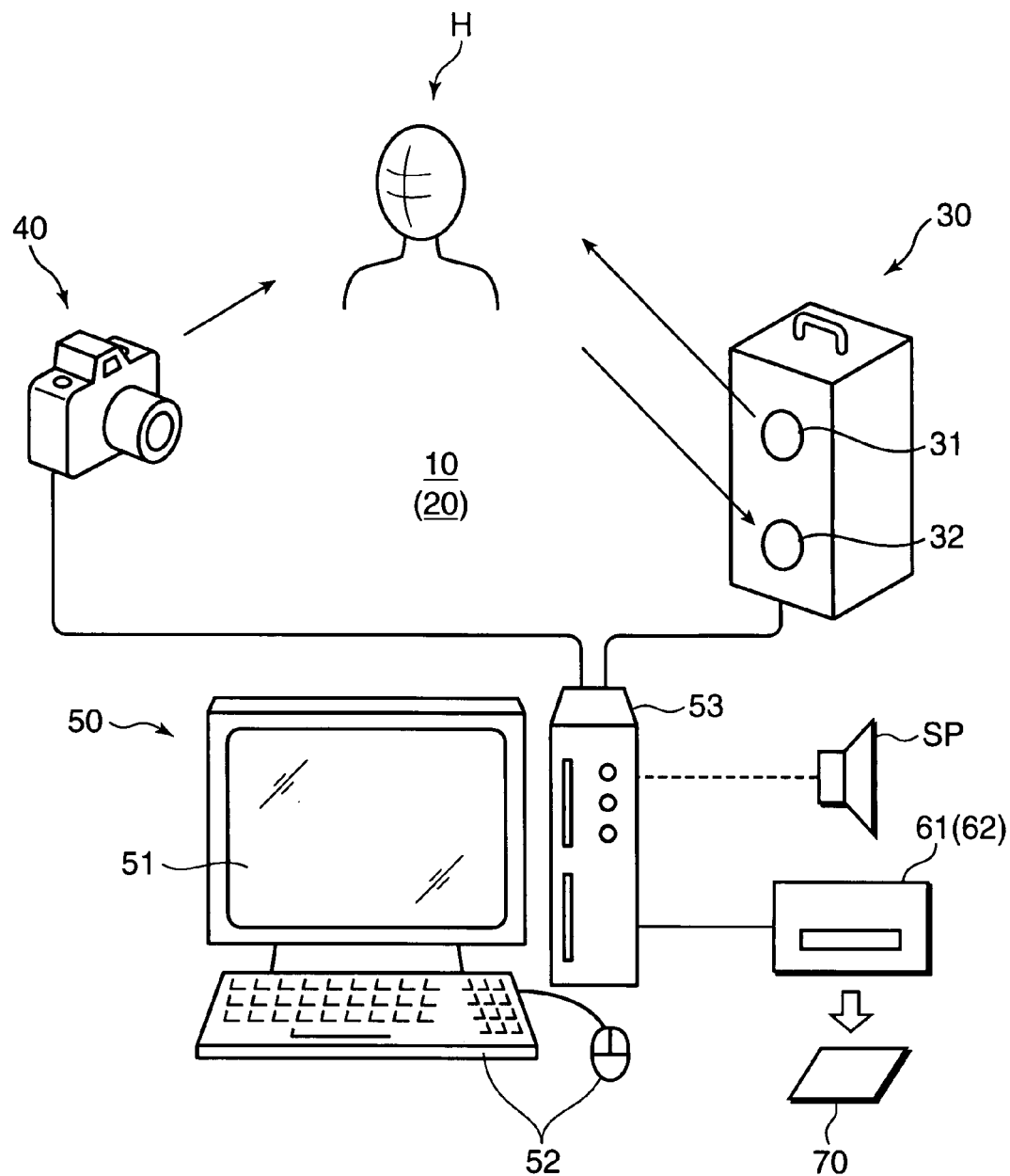
FIG. 2 is a diagram showing a hardware configuration of a register machine or a verifying machine constituting the face authentication system.

FIG. 2 is a diagram showing a hardware configuration of the register machine 10 or the verifying machine 20. The register machine 10 is adapted to acquire three-dimensional data and two-dimensional image data concerning the face of the subject H to write authentication data of the subject H into the IC card 70. The register machine 10 includes a non-contact three-dimensional digitizer 30, as a data input section, for inputting three-dimensional data concerning the face of the subject H, a digital camera 40 for inputting two-dimensional image data, a personal computer 50, as a processor, for performing a predetermined registration process, and an IC card writer 61 for writing authentication data into the IC card 70.

The three-dimensional digitizer 30 is adapted to input three-dimensional data concerning a face area of the subject H, using a method called a light-section method. The three-dimensional digitizer 30 has a substantially rectangular parallelepiped housing with a built-in optical unit provided with a light emitter and a light receiver. A light projector 31 formed with a light projecting window, and a light receiver 32 formed with a light receiving window are provided in the housing. The light projector 31 is disposed at an upper position away from the light receiver 32 by a predetermined distance depending on a baseline length.

The light projector 31 emits slit light, which is a laser beam flux irradiated in a horizontal direction. The slit light is planar light which is irradiated with a predetermined radiation angle in the horizontal direction i.e. with a fan-like shape, and has a certain width in a vertical direction. The slit light is projected toward the subject H. When the projected slit light is reflected on the face of the subject H, a part of the light reflected on the subject's face is allowed to be incident onto the light receiver 32. The three-dimensional digitizer 30 calculates a distance to a reflection point on the face area of the subject H by triangulation, based on a projection angle of the laser light, a receiving angle of the reflected light, and a baseline length between a light projecting point and a light receiving point. Three-dimensional data concerning the face area of the subject H is acquired at multiple points of a grid pattern.

The digital camera 40 includes an imaging optical system for forming a subject light image, and an image sensor for photoelectrically converting the subject light image into an image signal. The digital camera 40 is adapted to input two-dimensional digital image data concerning the face area of the subject H.

The personal computer 50 executes various computations for performing a predetermined registration process with respect to the subject H, by reading three-dimensional shape measurement data acquired by the three-dimensional digitizer 30, and image data acquired by the digital camera 40. The personal computer 50 includes a display section 51 provided with a liquid crystal display, an operation section 52 provided with a keyboard and a mouse, and a main body 53 provided with a hard disk device.

The construction of the verifying machine 20 is substantially the same as that of the register machine 10 except for the following. Specifically, the verifying machine 20 is provided with an IC card reader 62 for reading the authentication data recorded in the IC card 70, in place of the IC card writer 61. The personal computer 50 is functioned to perform a predetermined verification process. The primary parts of the processing contents to be executed by the verifying machine 20 are substantially the same as those to be executed by the register machine 10. The verifying machine 20 is provided with a speaker SP for generating a beep sound for alerting the subject H of authentication failure.

Figure 3:
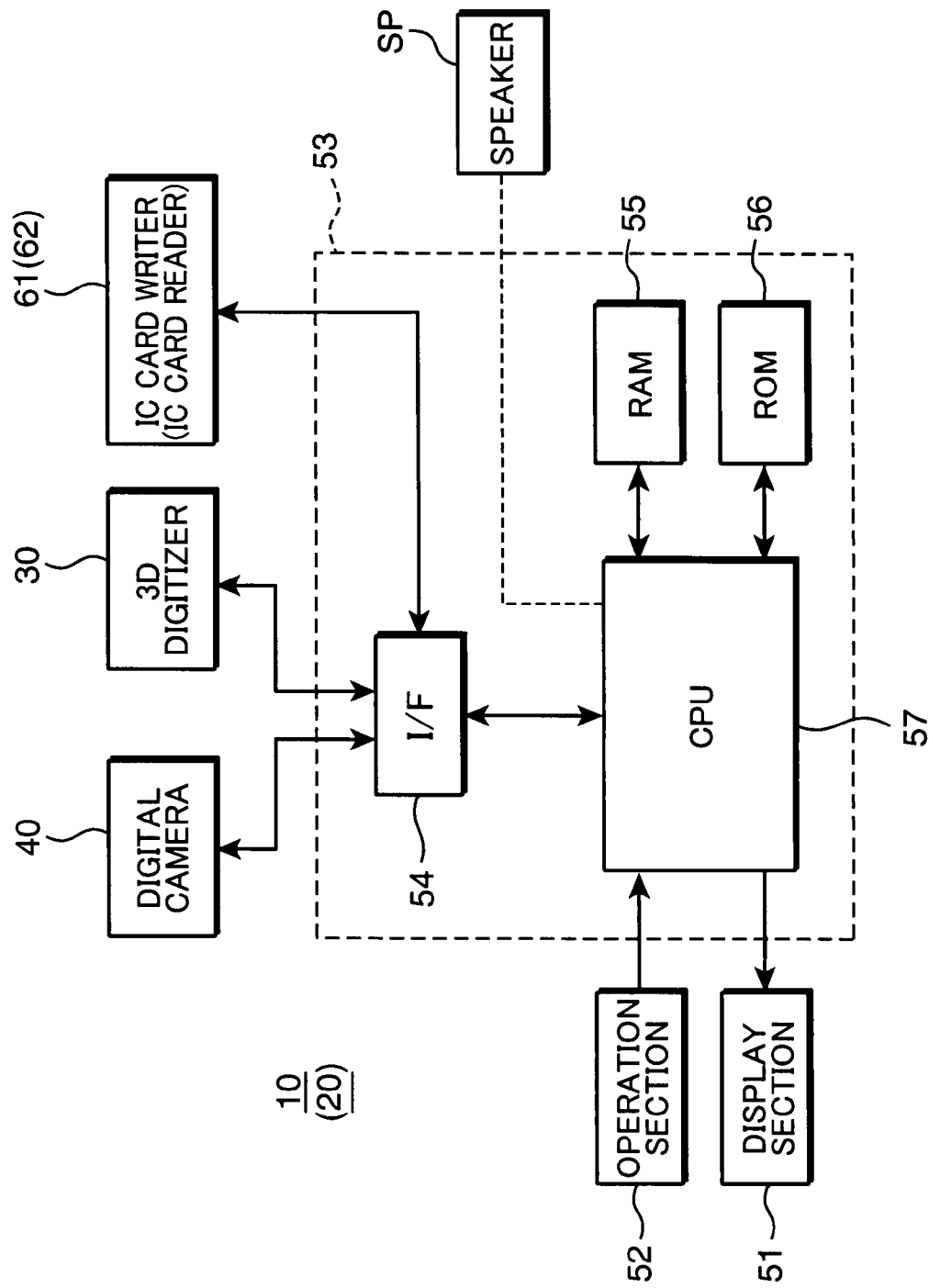
FIG. 3 is a block diagram showing a schematic arrangement of a main body of a personal computer to be used in the face authentication system.

FIG. 3 is a block diagram showing a schematic arrangement of the main body 53 of the personal computer 50. In order to acquire three-dimensional data and two-dimensional image data concerning the face area of the subject H, the computer main body 53 is provided with an interface 54 for enabling data communication with the three-dimensional digitizer 30 and the digital camera 40, an RAM (Random Access Memory) 55 for temporarily storing the three-dimensional data, the two-dimensional image data, and various data for computation process or control process, an ROM (Read Only Memory) 56 for storing various control programs and the like, and a CPU (Central Processing Unit) 57 for controlling the respective components to perform various operations.

Figure 4:
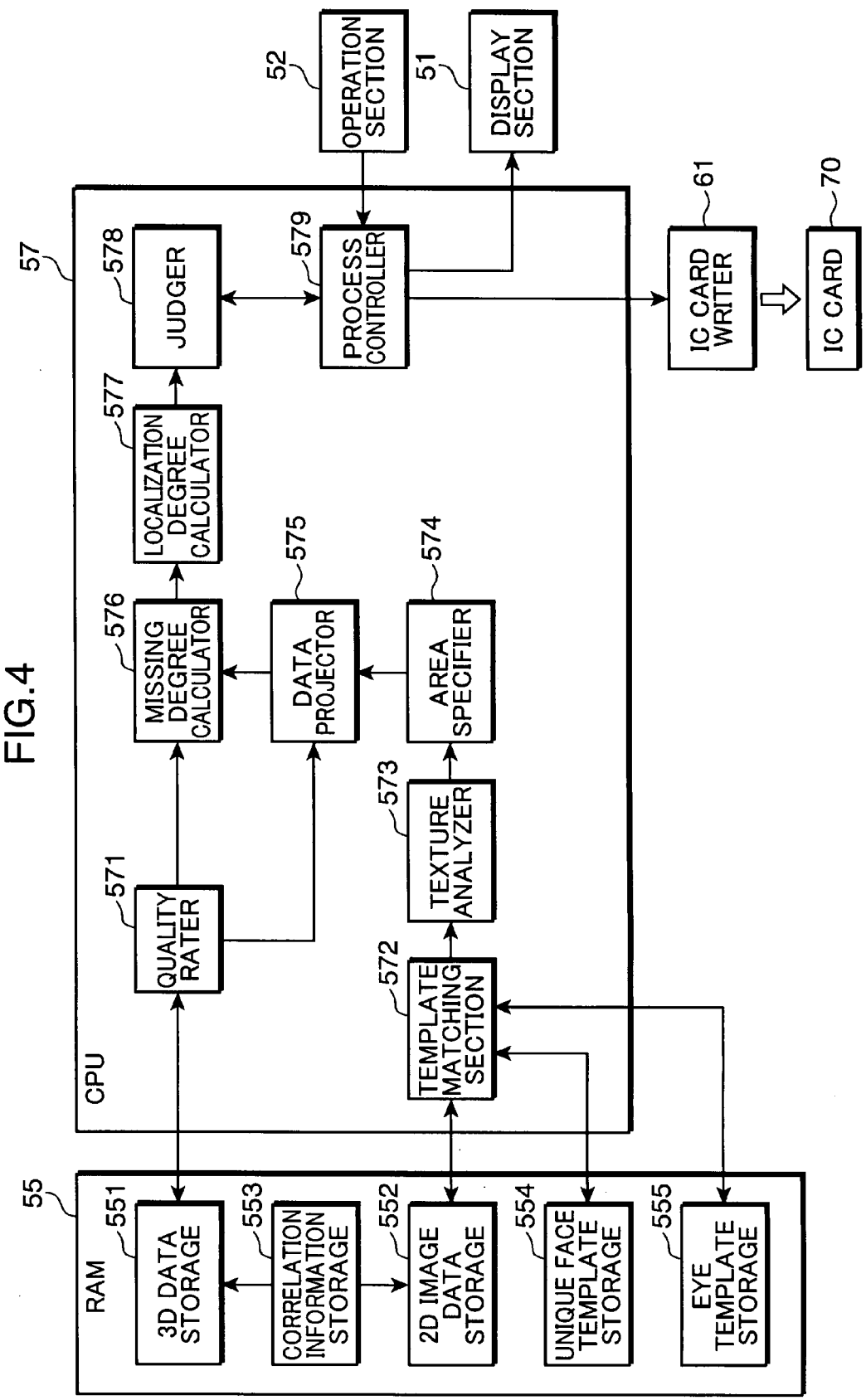
FIG. 4 is a functional block diagram showing a functional arrangement of a CPU of the register machine.

FIG. 4 is a functional block diagram showing a functional arrangement of the CPU 57 of the register machine 10 in correlation with the data to be temporarily stored in the RAM 55. By executing the control program stored in the ROM 56, the CPU 57 has a function of a quality rater 571 as a quality rating section, a template matching section 572, a texture analyzer 573, an area specifier 574 as a rating area specifying section, a data projector 575, a missing degree calculator 576, a localization degree calculator 577 as a quality distribution deriving section, a judger 578 as a judging section, and a process controller 579.

Figure 5:
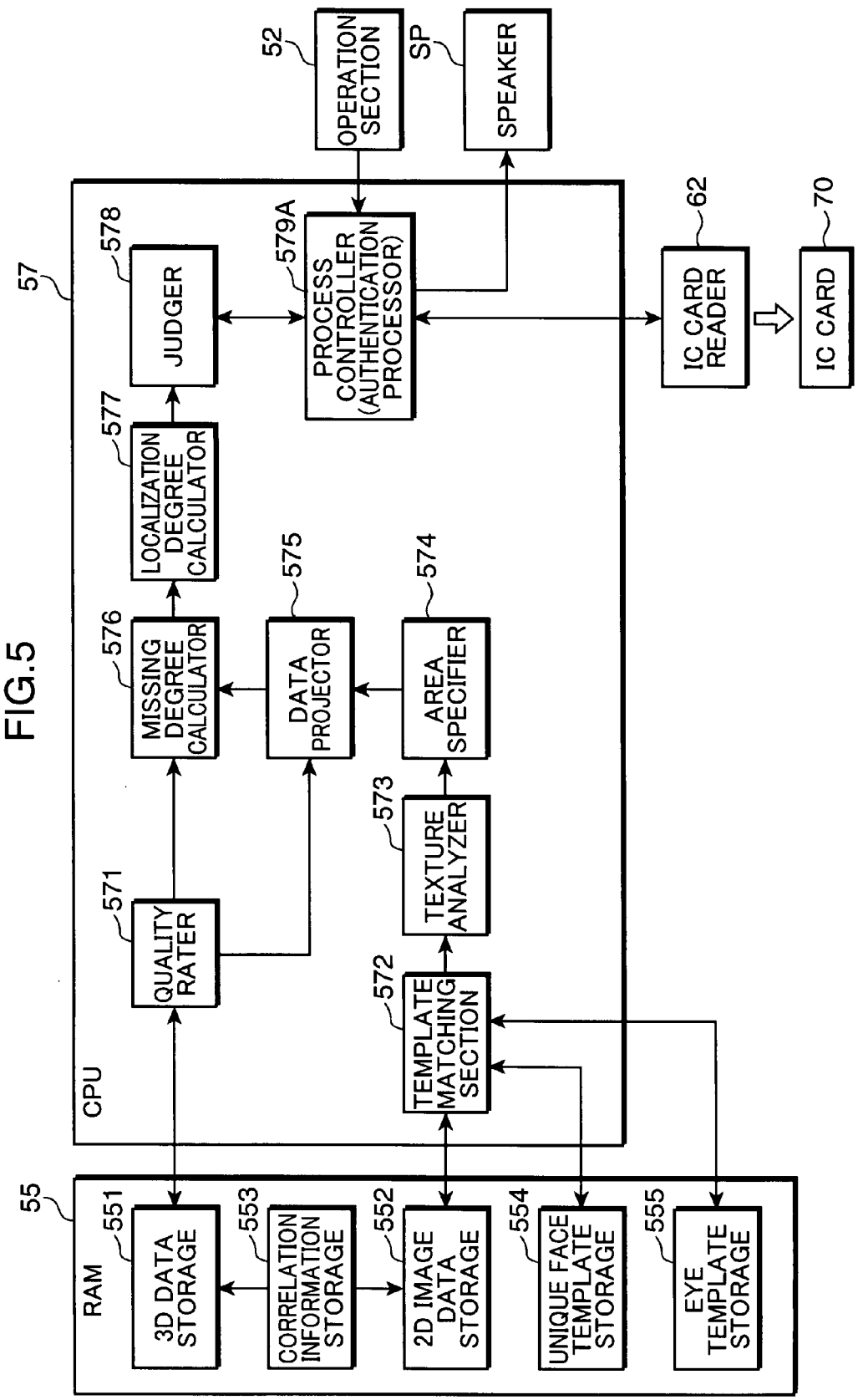
FIG. 5 is a block diagram showing a functional arrangement of a CPU of the verifying machine.

FIG. 5 is a functional block diagram showing a functional arrangement of the CPU 57 of the verifying machine 20 in correlation with the data to be temporarily stored in the RAM 55. The CPU 57 of the verifying machine 20 has the functional parts substantially identical to those of the register machine 10 except that the CPU 57 of the verifying machine 20 has a process controller 579A which also functions as an authentication processor. In the following, description is made based on a premise that the functional parts of the register machine 10 and the functional parts of the verifying machine 20 are identical to each other except for the process controllers 579 and 579A.

The RAM 55 includes a three-dimensional data storage 551 for storing three-dimensional data composed of a group of three-dimensional points arranged in e.g. a grid pattern, which is created based on three-dimensional shape measurement data including a face portion of the subject H, which is inputted from the three-dimensional digitizer 30; a two-dimensional image data storage 552 for storing two-dimensional image data including the face portion of the subject H, which is inputted from the digital camera 40; and a correlation information storage 553 for storing correlation information to be used in correlating positions between the three-dimensional data and the two-dimensional image data. The RAM 55 also includes a unique face template 554 for storing a unique face template of uniquely specifying the face of the subject H, which will be described later, and an eye template storage 555 for storing an eye template.

FIGS. 6A and 6B are diagrams showing an example of two-dimensional image data D1 and three-dimensional data D2 concerning a subject H, which are temporarily stored in the two-dimensional image data storage 552 and the three-dimensional data storage 551, respectively. In the embodiment, for convenience of describing a feature of the embodiment, the subject H wears a moustache "m", and three-dimensional data D2 is acquired, with his face facing slightly sideways i.e. slightly rightward.

Image coordinate P (x, y) of the two-dimensional image data D1, and three-dimensional coordinate Q (x, y, z) at a three-dimensional point constituting the three-dimensional data D2 are correlated to each other by a pre-calibrated projection matrix having identical dimensions. For instance, an image coordinate $P_1$ $(x_{11}, y_{11})$ of the two-dimensional image data D1 indicating a nose head of the subject H shown in FIG. 6A, and a three-dimensional coordinate $Q_1$ $(x_{11}, y_{11}, z_{11})$ of the three-dimensional data D2 indicating the nose head shown in FIG. 6B are correlated to each other, and positional correlations are defined between the image coordinate $P_1$ and the three-dimensional coordinate $Q_1$. The correlation information stored in the correlation information storage 553 is the data relating to the positional correlations.

The quality rater 571 rates the quality of the three-dimensional data D2 with respect to each of the points constituting the three-dimensional data D2, and generates quality data. The quality data is created by various methods. For instance, there is a method of rating the quality of the three-dimensional data D2, using a predetermined threshold value, and setting a valid flag or an invalid flag to each of the data corresponding to the three-dimensional points of the three-dimensional data D2.

Figure 7:
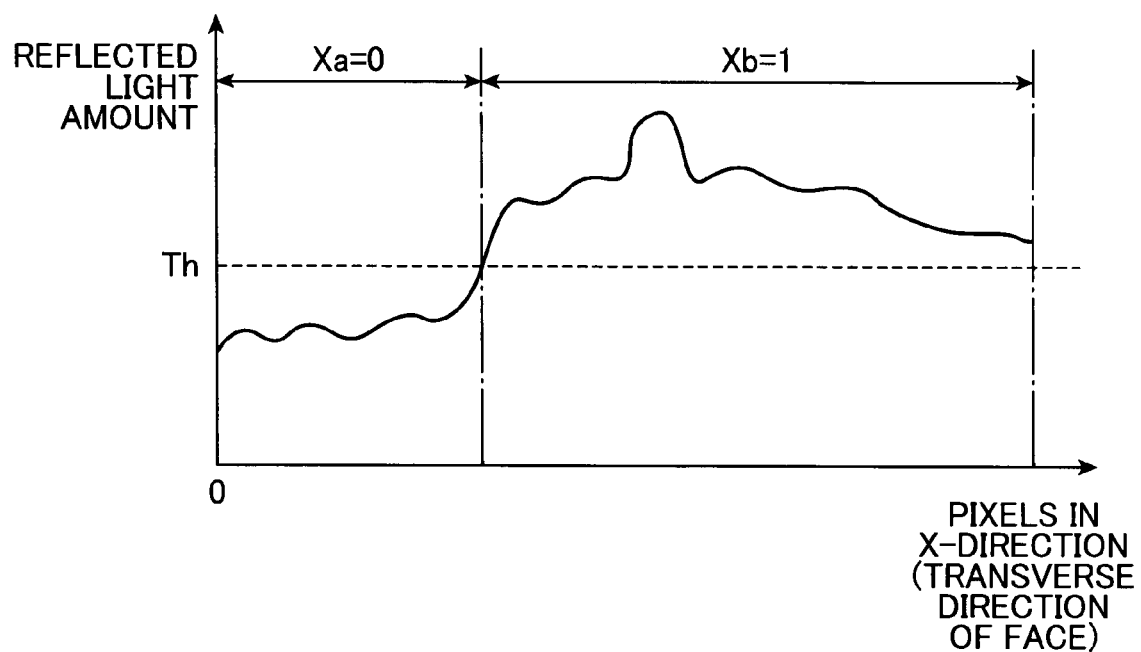
FIG. 7 is a graph showing an example as to how the data quality is rated, based on the amount of light reflected on the subject's face, which is received by a light receiver of a three-dimensional digitizer.

FIG. 7 is a graph showing an example of rating the data quality, based on the amount of light which is reflected on the face of the subject H and received by the light receiver 32 of the three-dimensional digitizer 30. FIG. 7 is a graphical expression of the reflected light amount with respect to an array of points of the three-dimensional data D2 in the X-direction in FIG. 6B i.e. in a transverse direction of the face of the subject H. In this example, a predetermined reflected light amount threshold value Th is set. An area Xa where a reflected light amount smaller than the threshold value Th is detected is rated to be of low quality, and an invalid flag (flag=0) is set to the three-dimensional data having a coordinate point in the area Xa. On the other hand, an area Xb where a reflected light amount equal to or larger than the threshold value Th is detected is rated to be of high quality, and a valid flag (flag=1) is set to the three-dimensional data having a coordinate point in the area Xb. Thus, the three-dimensional data D2 acquired by the three-dimensional digitizer 30 is rated in terms of binary data, and the coordinate point corresponding to the data to which the invalid flag is set is defined as a data missing point.

The process of setting the valid flag or the invalid flag may be executed by the three-dimensional digitizer 30. In other words, the function of the quality rater 571 may be provided in the three-dimensional digitizer 30. In the modification, the three-dimensional data D2 is stored in the three-dimensional data storage 551 in a state that validity/invalidity is described with respect to each of the points constituting the three-dimensional data D2.

Generally, specular reflection occurs with respect to eye areas of the subject in use of the three-dimensional digitizer 30 for measuring a three-dimensional shape of an object by projecting slit light. Accordingly, the three-dimensional digitizer 30 fails to receive reflected light suitable for measurement from the eye areas. As a result, it is highly likely that an invalid flag may be set to three-dimensional data having a coordinate point in a first area 81 and a second area 82 shown in FIG. 6B, which correspond to the areas of the eyes "e" and "e" of the subject H shown in FIG. 6A. Also, since the surface configuration of the area where the moustache "m" is located is extremely complex, light reflected on the moustache area is likely to scatter. Accordingly, the three-dimensional digitizer 30 also fails to receive reflected light suitable for measurement from the moustache area. As a result, it is highly likely that an invalid flag may be set to three-dimensional data having a coordinate point in a third area 83 corresponding to the area of the moustache "m".

Further, because lateral ends of the face have a large gradient, as compared with a front part of the face, light irradiated on the cheeks or their vicinities is less likely to be received, or may be received with a low reflection light amount. In particular, in the case where the face does not face forward, as shown in FIG. 6A, the right cheek "c" has a larger gradient, which may result in missing of three-dimensional data. On the other hand, since the other cheek i.e. the left cheek in FIG. 6A has a moderate gradient, missing of three-dimensional data is less likely to occur. As a result, an invalid flag is likely to be set to the three-dimensional data having a coordinate point in a fourth area 84 corresponding to the area of the cheek "c". In other words, if the face does not face forward, generally, missing of three-dimensional data appears asymmetrically with respect to a symmetry axis of the face, because the face is substantially symmetrical.

As mentioned above, in the case where three-dimensional data concerning the subject H wearing the moustache "m" is acquired, with the face of the subject H slightly facing rightward, as shown in FIG. 6B, it is highly likely that the quality rater 571 may set an invalid flag to the three-dimensional data having coordinate points in the first, second, third, and fourth areas 81, 82, 83, and 84 corresponding to the areas of the eyes "e", "e", the moustache "m", and the right cheek "c".

Figure 8:
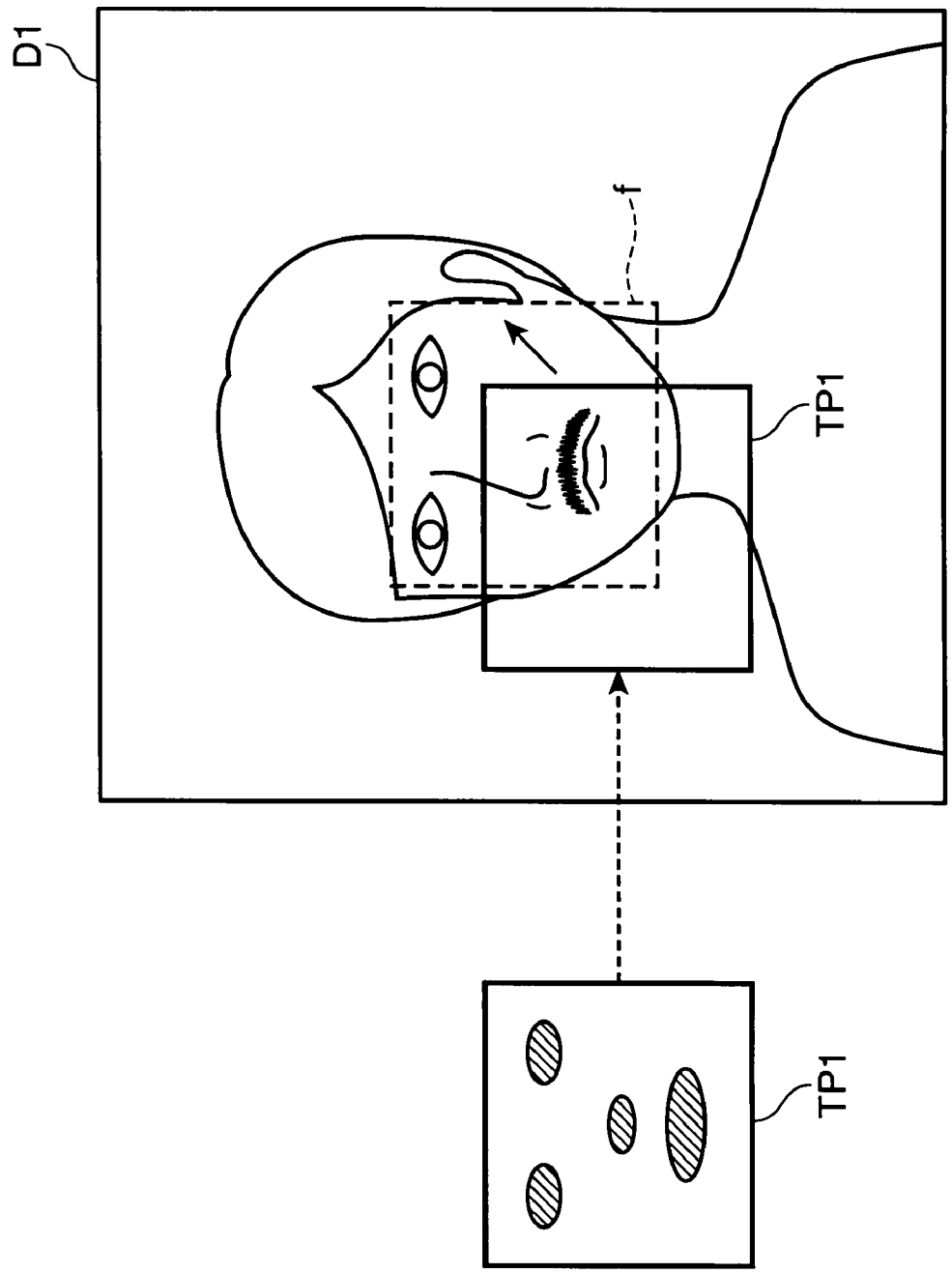
FIG. 8 is a diagram schematically showing a process of specifying a face area serving as an authenticating part, based on a two-dimensional image.

Referring back to FIG. 4, the template matching section 572 performs a process of specifying a face area as an authenticating part, based on the two-dimensional image of the subject H as shown in FIG. 6A. FIG. 8 is a diagram schematically showing the specifying process, wherein a process of matching a unique face template TP1 with the two-dimensional image data D1 acquired by the manner as shown in FIG. 6A is executed. Specifically, a degree of matching with the unique face template TP1 is verified by sliding and positioning the unique face template TP1 relative to the two-dimensional image of the subject H. Then, the area where the unique face template TP1 at a position where a highest degree of matching is obtained is lapped over the face image of the subject H is specified as a face area "f" of the subject H.

The unique face template TP1 is a rectangular template having dimensions capable of covering the eyes, the nose, and the mouth of the subject H. The unique face template TP1 is a template, in which the position, the shape, and a like characterizing element of the eyes, the nose, the mouth, and a like facial component of a human are specified, based on information acquired from multitudes of persons. The information relating to the unique face template TP1 is stored in advance in the unique face template storage 554 of the RAM 55. The template matching section 572 performs a process of reading the unique face template TP1 from the unique face template storage 554, and matching the unique face template TP1 with the two-dimensional image data D1. By specifying the face area "f" of the subject H in the aforementioned manner, the hair portion of the subject H which is an improper element for authentication is removed.

Figure 9:
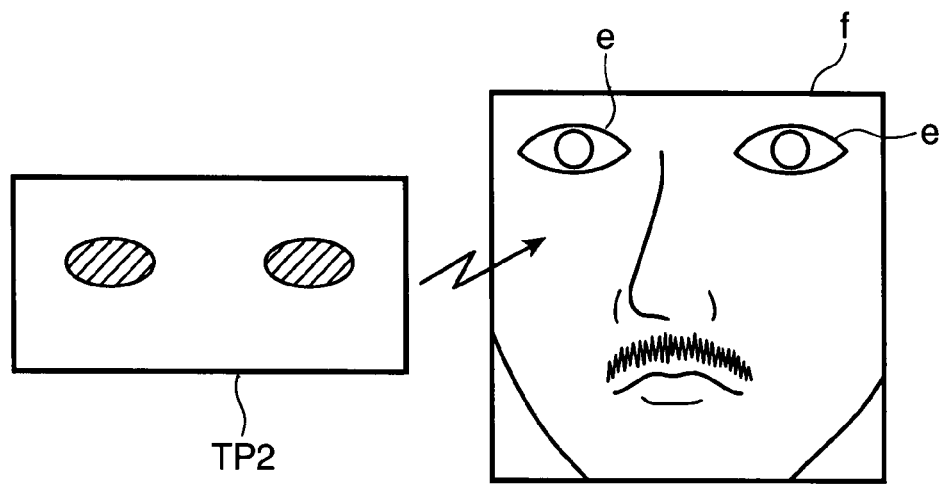
FIG. 9 is a diagram schematically showing a process of specifying eye areas from the face area.

The template matching section 572 also performs a process of specifying the areas corresponding to the eyes "e" and "e" of the subject H with respect to the face area "f" which has been specified based on the two-dimensional image. FIG. 9 is a diagram schematically showing the specifying process. Similarly to the above, the template matching section 572 performs a process of matching an eye template TP2 with the two-dimensional image concerning the face area "f", and the area where the eye template TP2 at a position where a highest degree of matching is obtained is lapped over the face area "f" is specified as areas corresponding to the eyes "e" and "e" of the subject H. The template matching section 572 performs a process of reading the eye template TP2 from the eye template storage 555, and performs a process of matching the eye template TP2 with the two-dimensional image data concerning the face area "f".

Figure 10:
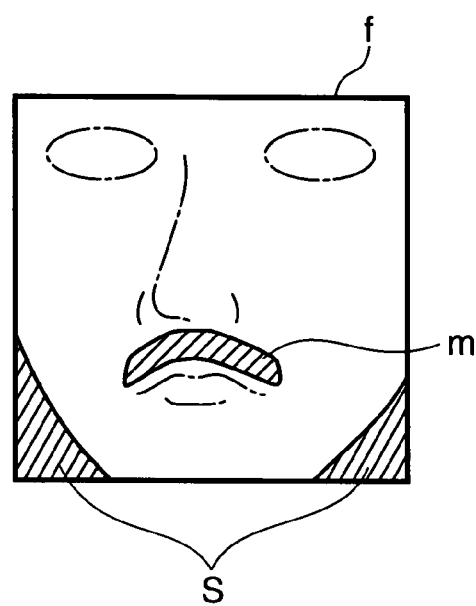
FIG. 10 is a diagram schematically showing a state that a moustache area and an out-of-face-contour area are specified with respect to an image of the face area.

The texture analyzer 573 performs texture analysis with respect to the two-dimensional image data concerning the face area "f" to identify the area where the facial hair on a lower part of the face such as beard or moustache, in this example, the moustache "m" is primarily is located. For instance, the texture analyzer 573 performs texture analysis such as Gabor filter energy or luminance co-occurrence matrix, and specifies a pixel area where the parameter of the obtained texture feature quantity is equal to or smaller than a predetermined value, as the area of the moustache "m". Also, in the case where it is judged that the two-dimensional image data concerning the face area "f" includes an out-of-face-contour area "s" corresponding to a portion other than the face area, based on the texture feature quantity, the texture analyzer 573 also specifies the out-of-face-contour area "s" with respect to the face area "f". FIG. 10 is a diagram schematically showing a state that the area of the moustache "m", and the out-of-face-contour area "s" are specified with respect to the image of the face area "f".

The area specifier section 574 performs a process of removing, from the face area "f", an area corresponding to a uniquely identifying portion of a living body that uniquely identifies the living body, and specifying, on the two-dimensional image, a rating area to be used in rating the quality of three-dimensional data i.e. calculating a degree of localization, which will be described later. In this embodiment, the uniquely identifying portion of the living body is the eyes and the moustache of the subject H.

Figure 11:
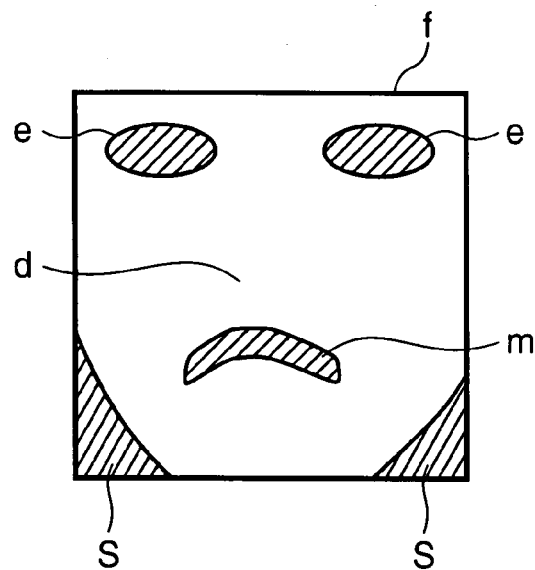
FIG. 11 is a diagram schematically showing a process of specifying a rating area to be used in rating a localization degree of three-dimensional data.

FIG. 11 is a diagram schematically showing the process of specifying the rating area by the area specifier 574. In the process of specifying the rating area, the areas of the eyes "e" and "e", which have been specified using the eye template TP2 by the template matching section 572, are removed from the face area "f", which has been specified using the unique face template TP1 by the template matching section 572. In other words, description relating to removal information is given to pixel outputs at coordinates corresponding to the areas of the eyes "e" and "e". Also, the area of the moustache "m" which has been specified by the texture analyzer 573, and the out-of-face-contour area "s" are removed from the face area "f" in a similar manner as mentioned above. Thus, the remainder of the face area "f" obtained by the removal operations is specified as the rating area "d".

The data projector 575 performs a process of projecting the three-dimensional data D2 stored in the three-dimensional data storage 551 onto the rating area "d" which has been specified on the two-dimensional image by the area specifier 574. Specifically, the data projector 575 performs coordinate transformation from three-dimensional coordinate values at the effective grid points of the three-dimensional data D2 to which the invalid flag is not set by the quality rater 571, into pixel coordinate values of the two-dimensional image data D1, using a predetermined coordinate transformation matrix. Then, the data projector 575 specifies an area where the effective grid points are not projected within the rating area "d", as a three-dimensional data missing area.

Figure 12:
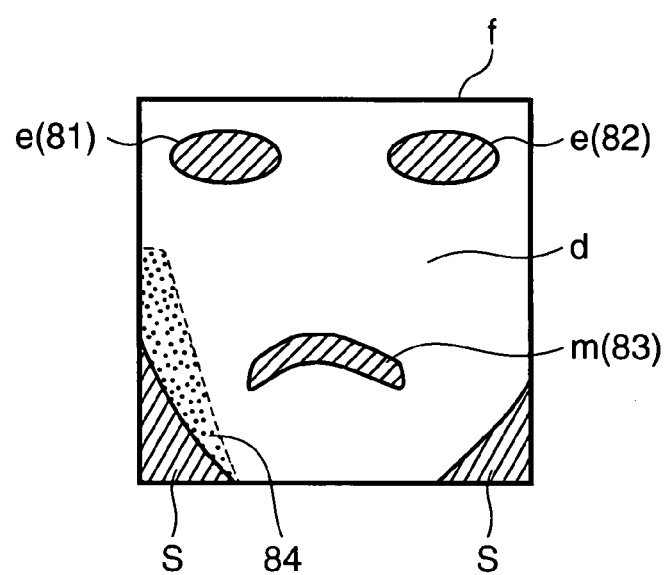
FIG. 12 is a diagram schematically showing a process to be executed by a data projector.

FIG. 12 is a diagram schematically showing the process to be executed by the data projector 575. As described referring to FIG. 6B, in the example of the embodiment, the invalid flag is set to the three-dimensional data constituted of grid points, which are located in the first, second, third, and fourth areas 81, 82, 83, and 84 corresponding to the areas of the eyes "e", "e", the moustache "m", and the right cheek "c". In the embodiment, the areas of the eyes "e", "e", and the area of the moustache "m" have already been removed from the rating area "d". Accordingly, merely the fourth area 84 corresponding to the area of the right cheek "c" is specified as the three-dimensional data missing area.

The missing degree calculator 576 calculates a ratio of the three-dimensional data missing area relative to the area specified as the rating area "d". In this example, the area ratio P representing the ratio of the fourth area 84 relative to the rating area "d" is calculated. The calculation of the area ratio P is executed to check whether a data amount capable of providing sufficient reliability is secured, because an exceedingly large area ratio of the three-dimensional data missing area means degraded data reliability.

The localization degree calculator 577 calculates a localization degree of the three-dimensional data missing area with respect to the face area "f". The three-dimensional data missing area is a low quality part where the quality of the three-dimensional data is rated to be low. The localization degree is derived in an axis direction corresponding to a transverse direction of the face i.e. the X-axis direction in FIG. 6B. This is because three-dimensional data is likely missing in a condition that the face faces sideways, as compared with a condition that the face faces upward or downward. In other words, the data missing degree is large in the case where the cheeks having a larger gradient are displaced sideways, as compared with the case where the chin with a smaller area or the forehead with a relatively moderate slope is displaced. Accordingly, deriving the localization degree in the X-axis direction corresponding to the transverse direction of the face enables to efficiently and accurately rate the localization of the three-dimensional data missing area.

Figure 13:
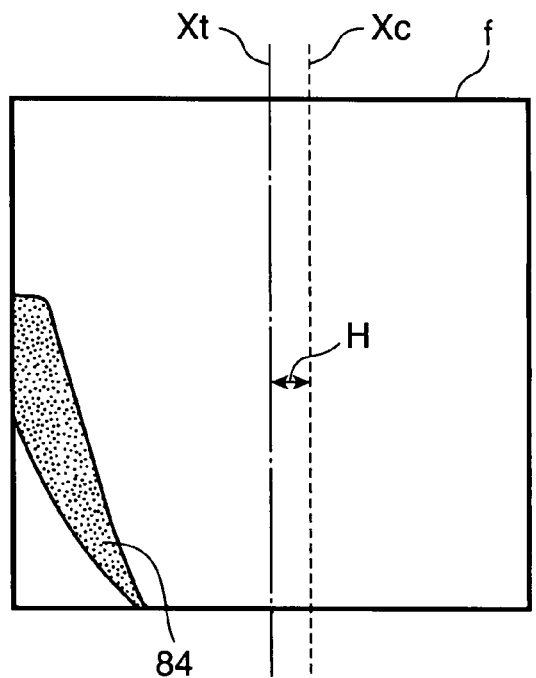
FIG. 13 is a diagram schematically showing a method for deriving a localization degree of three-dimensional data.

The localization degree calculator 577 derives the localization degree, based on a judgment as to how much the centroid position of the face area excluding the three-dimensional data missing area is deviated from the center position of the rating area "d" for rating the missing condition of the three-dimensional data. FIG. 13 is a diagram schematically showing a method for deriving the localization degree. Let it be assumed that the coordinate of the center position of the rating area "d" is Xt, the coordinate of the centroid position of the effective area excluding the three-dimensional data missing area is Xc, and the three-dimensional data missing area (in this example, the portion corresponding to the fourth area 84) is "g". Then, the coordinate Xc of the centroid position of the effective area can be calculated by the following formula (1) where "i" is the pixel position of the two-dimensional image.

$$X_c = \frac{\sum_i \delta(i \in d \ \& \ i \notin g) \cdot x_i}{\sum_i \delta(i \in d \ \& \ i \notin g)} \quad (1)$$

Then, the localization degree H can be calculated by the following formula (2), using the coordinate Xc representing the centroid position of the effective area and the coordinate Xt representing the center position of the rating area "d".

$$H = |X_c - X_t| \quad (2)$$

Figure 14:
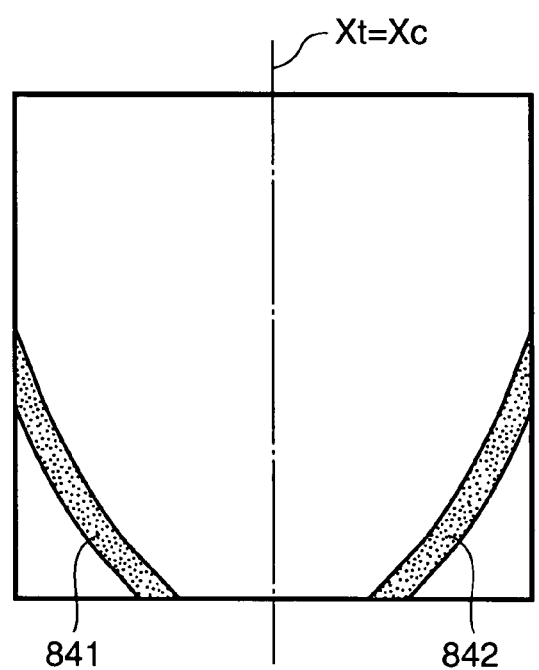
FIG. 14 is a diagram schematically showing an example as to how a localization degree of three-dimensional data is derived.

Generally, the localization degree H changes depending on an orientation of the face. In other words, as far as the face faces forward, the quality is distributed in such a manner that the central part of the face image has high quality, and a peripheral part thereof has substantially uniformly low quality. Specifically, as shown in FIG. 14, three-dimensional data missing areas 841 and 842 appear at portions corresponding to peripheral ends of the cheeks. In this case, the ratio of the data missing area is small, and a sufficiently large amount of authentication data is obtainable. On the other hand, as shown in FIG. 13, in the case where the face does not face forward, the data missing area i.e. the fourth area 84 locally appears at a certain peripheral portion of the face area. In this case, the ratio of the data missing area is relatively large, and a sufficiently large amount of data for performing accurate authentication is not obtained.

In use of the register machine 10 (see FIG. 4), the judger 578 judges whether a writing process of registering authentication data into the IC card 70 by the IC card writer 61 is to be executed, based on the localization degree H calculated by the localization degree calculator 577, and the three-dimensional data missing area ratio P calculated by the missing degree calculator 576. In use of the verifying machine 20 (see FIG. 5), the judger 578 judges whether the process controller 579A is operative to perform a verification process with the authentication data read from the IC card 70 by the IC card reader 62.

The judgment by the judger 578 is performed based on a judgment as to whether the localization degree H and the area ratio P exceeds respective predetermined threshold values. Specifically, if the three-dimensional data missing area locally appears as shown in FIG. 13, the judger 578 judges that a registration process or a verification process is not to be executed. If the localization degree of the three-dimensional data missing area is small, as shown in FIG. 14, the judger 578 judges that a registration process or a verification process is to be executed.

The process controller 579 performs overall control of controlling the respective functional parts in the CPU 57 to execute the aforementioned operations in response to an operation signal given by the user through the operation section 52. Then, in use of the register machine 10, if the judger 578 judges that the registration process is executable, the process controller 579 issues a control signal to the IC card writer 61 to write authentication data into the IC card 70. Upon receiving the control signal, the IC card writer 61 writes, into the IC card 70, a template of the two-dimensional image data D1 and the three-dimensional data D2 concerning the subject H in a predetermined format.

If, on the other hand, the judger 578 judges that the registration process is not executable, the process controller 579 generates a notification signal of notifying the user that the registration process is not executable. The notification signal is displayed on the display section 51, as a message e.g. "Please input the face image again". In this condition, the currently inputted three-dimensional data and two-dimensional image data from the three-dimensional digitizer 30 and the digital camera 40 are restrained from being written into the IC card 70.

In use of the verifying machine 20, if the judger 578 judges that the registration process is executable, the process controller 579A issues a control signal to the IC card reader 62 to read the authentication data from the IC card 70. Then, the process controller 579A is operative to execute a process of matching the three-dimensional data and the two-dimensional image data which have been currently inputted from the three-dimensional digitizer 30 and the digital camera 40 for verification, with the template of the three-dimensional data and the two-dimensional image data recorded in the IC card 70. The verification process may include e.g. an approach of matching a three-dimensional image and a two-dimensional image with unique face parameters, respectively, using multimodal verification (e.g. multimodal verification disclosed in Kevin W. Bowyer, Kyong Chang and Patrick Flynn, An Evaluation of Multimodal 2D+3D face Biometrics, IEEE Trans. on Pattern Analysis and Machine Intelligence, 27(4):619-624, April 2005).

If, on the other hand, the judger 578 judges that the registration process is not executable, the process controller 579A generates a notification signal of notifying the user that the registration process is not executable. The notification signal is converted into e.g. an audio signal, and a beep sound of prompting the user to input three-dimensional data and two-dimensional image data again is outputted from the speaker SP. In this case, an authentication process is not executed.

Figure 15:
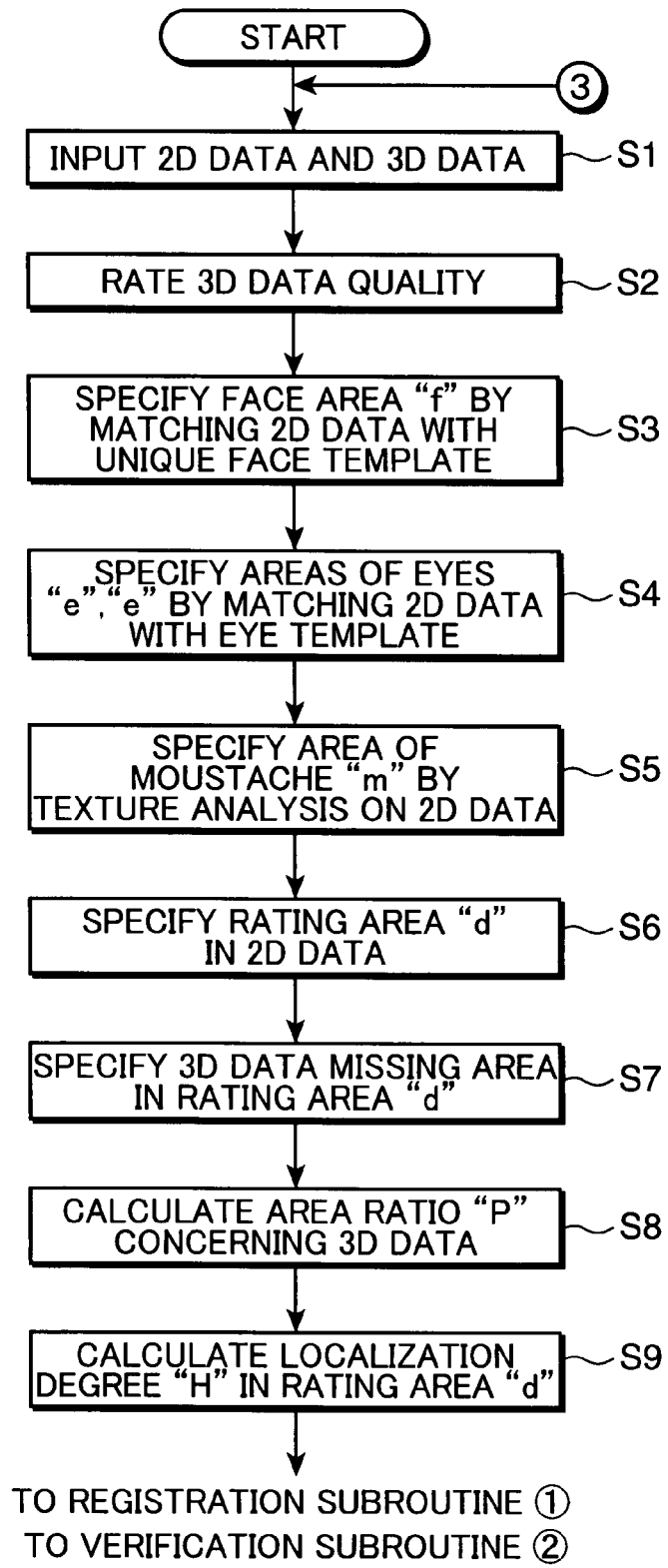
FIG. 15 is a flowchart showing an operation flow to be executed by the face authentication system.

In the following, an operation to be executed by the face authentication system embodying the invention is described. FIG. 15 is a flowchart showing an operation flow to be executed by the face authentication system. When the routine of the face authentication system is started, as shown in FIG. 2, two-dimensional image data (hereinafter, called as "2D data") and three-dimensional data (hereinafter, called as "3D data") concerning the subject H are obtained by the three-dimensional digitizer 30 and the digital camera 40, and the 2D data and the 3D data are inputted to the main body 53 of the personal computer 50 (Step S1). The 2D data and the 3D data are temporarily stored in the RAM 55.

Then, the quality rater 571 executes a process of rating the quality of the 3D data, using the 3D data (Step S2). For instance, a valid flag/invalid flag is set to the 3D data, based on the reflected light amounts at the grid points of the 3D data. The quality rating may be performed by the three-dimensional digitizer 30.

Then, the template matching section 572 performs a process of matching the 2D data with the unique face template TP1, using the 2D data, as shown in FIG. 8, to specify the face area "f" of the subject H (Step S3). Then, as shown in FIG. 9, the template matching section 572 performs a process of matching the 2D data concerning the face area "f" with the eye template TP2 to specify the areas of the eyes "e" and "e" (Step S4).

Then, the texture analyzer 573 performs texture analysis with respect to the 2D data concerning the face area "f" (Step S5). If the subject H wears the moustache "m", for instance, the area of the moustache "m" is specified based on the texture feature quantity. The out-of-face-contour area "s" is also specified (see FIG. 10).

Then, the area specifier 574 specifies the rating area "d" for rating the localization degree of the 3D data missing area in the 2D data concerning the face area "f" (Step S6). The specifying process is a process of removing the areas of the eyes "e", "e", the area of the moustache "m", and the out-of-face-contour area "s" from the face area "f" (see FIG. 11).

Then, the data projector 575 performs a process of projecting the 3D data onto the rating area "d" which has been specified on the 2D data. Specifically, the 3D data to which the valid flag is set in Step S2 is projected onto the rating area "d". Then, the 3D data missing area is specified in the rating area "d" (Step S7). For instance, in the case where 3D data is acquired in a condition that the subject H faces rightward, the fourth area 84 corresponding to the right cheek area is specified as the 3D data missing area (see FIG. 12).

Thereafter, the missing degree calculator 576 calculates the ratio P of the 3D data missing area relative to the rating area "d" (Step S8). Also, the localization degree calculator 577 calculates the localization degree H of the 3D data missing area, as shown in FIG. 13, based on the formulae (1) and (2) (Step S9).

Figure 16:
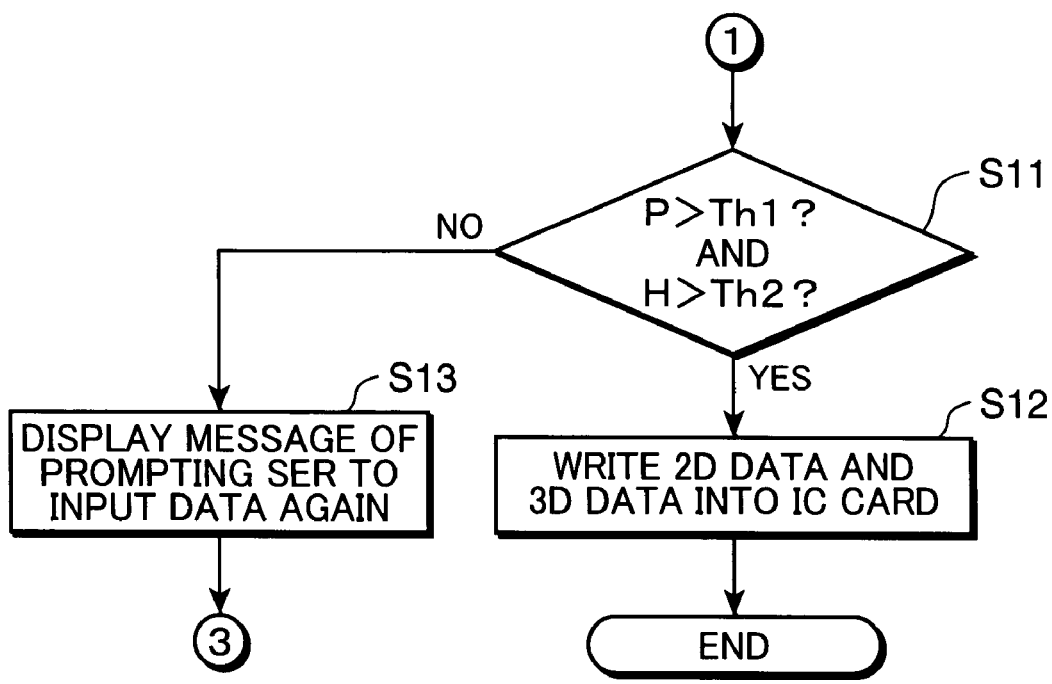
FIG. 16 is a flowchart showing a process to be executed after Step S9 in FIG. 15 in registering authentication data.

FIG. 16 is a flowchart showing a process to be executed after Step S9 in registering authentication data i.e. in use of the register machine 10. In this case, the judger 578 judges whether the area ratio P exceeds a predetermined threshold value Th1, and the localization degree H exceeds a predetermined threshold value Th2, respectively (Step S11).

If the area ratio P and the localization degree H exceed the threshold values Th1 and Th2, respectively (YES in Step S11), the process controller 579 controls the IC card writer 61 to write the currently inputted 2D data and 3D data into the IC card 70 as authentication data (Step S12). If, on the other hand, one or both of the area ratio P and the localization degree H is equal to or lower than the threshold value Th1, Th2 (NO in Step S11), the process controller 579 causes the display section 51 to display a prompt message of prompting the user to input 2D data and 3D data again i.e. a predetermined message or a like message (Step S13). Thereafter, the routine returns to Step S1 in FIG. 15 to repeat the process thereafter.

Figure 17:
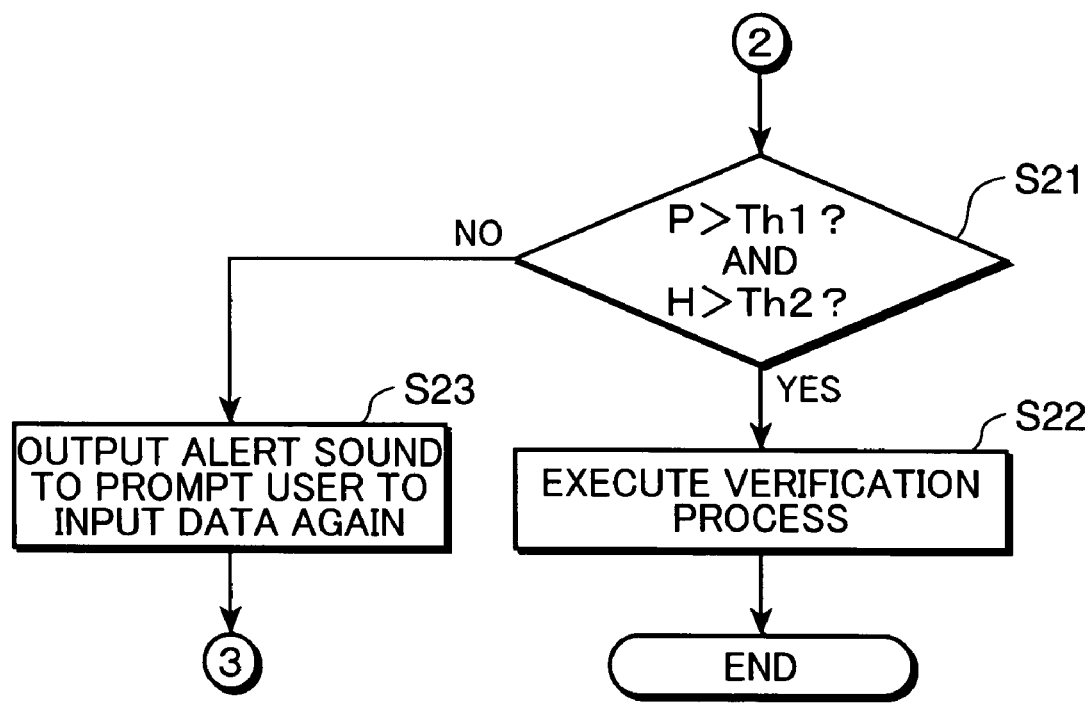
FIG. 17 is a flowchart showing a process to be executed after Step S9 in FIG. 15 in verifying authentication data.

FIG. 17 is a flowchart showing a process to be executed after Step S9 in performing the verification process, i.e. in use of the verifying machine 20. Similarly to the above case, the judger 578 judges whether the area ratio P exceeds the predetermined threshold value Th1, and the localization degree H exceeds the predetermined threshold value Th2, respectively (Step S21).

If the area ratio P and the localization degree H exceed the threshold values Th1 and Th2, respectively (YES in Step S21), the process controller 579A controls the IC card reader 62 to read the authentication data recorded in the IC card 70, and executes a process of verifying the recorded data with the currently inputted 2D data and 3D data (Step S22). If, on the other hand, one or both of the area ratio P and the localization degree H is equal to or lower than the threshold value Th1, Th2 (NO in Step S21), the process controller 579A causes the speaker SP to output an alert sound e.g. a beep sound for prompting the user to input 2D data and 3D data again (Step S23). Thereafter, the routine returns to Step S1 in FIG. 15 to repeat the process thereafter.

In the face authentication system of the embodiment, the quality rater 571 generates quality data to which either one of the valid flag and the invalid flag is set with respect to each of the points constituting the three-dimensional data. Then, a quality distribution concerning the face area "f" is obtained by the localization degree calculator 577. Thus, a three-dimensional data missing condition resulting from the face orientation can be easily and accurately grasped. Since the data quality can be precisely rated in registering or verifying three-dimensional data, the embodiment is advantageous in performing an authentication operation with high precision.

The invention has been described based on the foregoing embodiment, but is not limited thereto. For instance, the following modifications <1> through <7> may be applied to the invention.

<1> The embodiment has been described concerning the example of rating the quality of three-dimensional data by binary data i.e. whether a valid flag or an invalid flag is set. Alternatively, the three-dimensional data quality may be rated based on three-dimensional data before binarization. For instance, in the case where reflected light amount data i.e. a predetermined criterion as shown in FIG. 7 is acquired, the reflected light amount data itself may be defined as a reliability value Wi with respect to each of the points constituting the three-dimensional data.

In the modification, the localization degree calculator 577 calculates the centroid of the reliability value Wi based on the following formula (3), in place of calculating the centroid of the effective area to which the valid flag is set, based on the formula (1). In the modified arrangement, the localization degree is obtained in terms of the reliability value before binarization, unlike an arrangement of rating the three-dimensional data quality by binary data. This enables to obtain the localization degree in a finer manner.

$$X_c = \frac{\sum_{i \in d} Wi \cdot x_i}{\sum_{i \in d} Wi} \qquad (3)$$

<2> In obtaining a two-dimensional image and a three-dimensional image by the digital camera 40 and the three-dimensional digitizer 30, there is a case that an image of the subject H is captured, with his or her neck being tilted, despite that the subject H faces forward. An image including a large tilted angle of the neck may adversely affect in rating the localization degree of the three-dimensional data quality in the X-axis direction i.e. the transverse direction of the face. Considering such a drawback, in detecting the positions of the eyes "e" and "e" with use of the eye template TP2 (see FIG. 9), as described in the embodiment, it is preferable to provide a step of generating a line connecting the eyes "e" and "e", and angularly rotating a two-dimensional image and a three-dimensional image so that the connecting line is in parallel with the X-axis.

Figure 18:
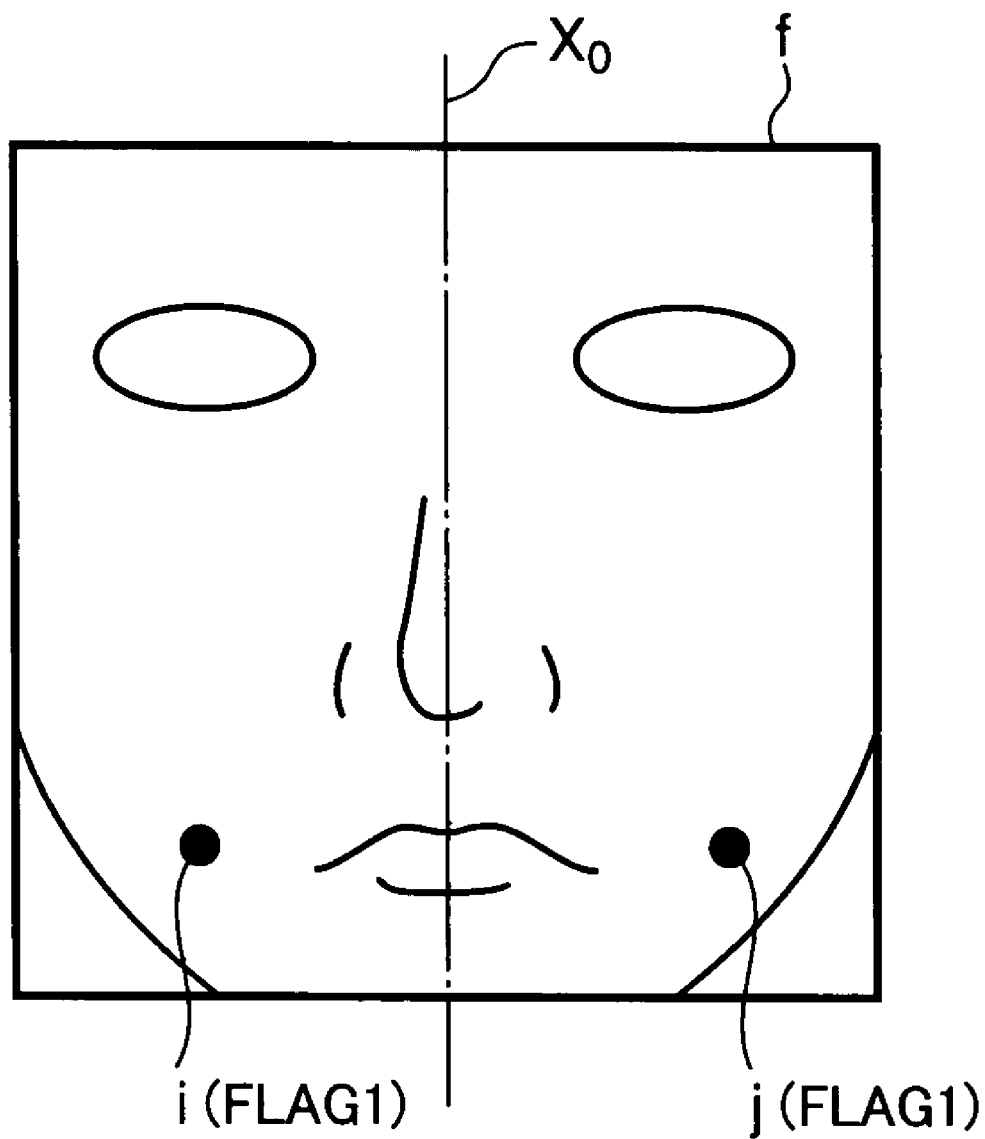
FIG. 18 is a diagram schematically showing a modified method for deriving a localization degree of three-dimensional data.

<3> A method for deriving a predetermined position of the face based on a predetermined reference symmetry degree may be adopted, as a method for obtaining a localization degree concerning missing of three-dimensional data. FIG. 18 is a diagram schematically showing the method based on the symmetry degree. Specifically, a symmetry axis $X_0$ with respect to an image of the face area "f" i.e. an axis substantially perpendicularly intersecting with the transverse direction of the face is defined. First, a pixel "i", and a pixel "j" symmetrical to the pixel "i" with respect to the symmetry axis $X_0$ are selected. Then, the quality of the two pixels i.e. the flag set to the pixel "i" and the flag set to the pixel "j" in the embodiment are compared. Then, if the flag set to the pixel "i" and the flag set to the pixel "j" are not coincident with each other, the judgment result indicates that the pixel pair involves localization. The aforementioned process is executed with respect to each of the pixels. Thus, the localization degree concerning missing of three-dimensional data is rated, based on the number of pixel pairs which are judged to have localization.

<4> Even in the case where the localization degree H obtained by the formula (2) is lower than the predetermined threshold value in e.g. performing a verification process, the verification process may be performed after removing the three-dimensional data missing area. Further alternatively, the verification process may be performed after performing a weighing process of lowering a contribution degree of the three-dimensional data missing area.

<5> In the case where the judger 578 judges that a registration process or a verification process with respect to the IC card 70 is not to be executed, the process controller 579 or 579A may cause the display section 51 to display specific information of prompting the user to change the conditions for acquiring two-dimensional data and three-dimensional data by the digital camera 40 and the three-dimensional digitizer 30 e.g. a message "Please shoot your image, with your face facing forward", a message of prompting the user to change the photographing condition such as an illumination condition, or a selection image for allowing the user to select a proper photographing condition. Further alternatively, a control signal of automatically changing the photographing condition or a like condition of the digital camera 40 and the three-dimensional digitizer 30 may be generated in the process controllers 579 and 579A. In the latter modified arrangement, if the acquired two-dimensional and three-dimensional data are improper, a notification signal of prompting the user to change the condition for acquiring these data, or a control signal of changing the condition for acquiring these data is generated. This allows the user to re-execute a registration process or a verification process in a more advantageous condition.

<6> In the embodiment, the three-dimensional digitizer 30 serves as a data input section for inputting three-dimensional data. A three-dimensional shape measuring apparatus other than the three-dimensional digitizer 30 is applicable to the invention. For instance, it is possible to adopt a three-dimensional shape measuring apparatus using two digital cameras according to a stereoscopic imaging system.

<7> In the embodiment, the IC card 70 is carried by the subject. In place of using the IC card 70, authentication data concerning the subject may be recorded in a center server via the register machine 10, the verifying machine 20 may be connected to the center server via the Internet or a like network system, and a verification process may be performed by reading the authentication data from the center server for verification.

The foregoing embodiment and/or modifications primarily include the inventions having the following arrangements.

A face authentication system according to an aspect of the invention includes a data input section for obtaining three-dimensional data concerning a face area of a subject at multiple points, and a processor for performing a registration process or a verification process of authentication data of the subject based on the three-dimensional data. The processor has a quality rater for rating a quality of the three-dimensional data with respect to each of the points of the three-dimensional data to generate quality data, and a quality distribution deriving section for deriving a distribution of the quality with respect to the face area, based on the quality data.

In the above arrangement, the quality data is generated by the quality rater with respect to each of the points constituting the three-dimensional data, and the quality distribution with respect to the face area is derived by the quality distribution deriving section. If a part of the three-dimensional data is missing due to a face orientation or a like factor, a typical pattern concerning the data missing condition can be derived to some extent. This is because the human face is substantially symmetrical. Specifically, lateral ends of the face have a larger gradient, as compared with a front part of the face. In the case where the face does not face forward, it is highly likely that a missing part of the three-dimensional data i.e. a part of the three-dimensional data where the data quality is poor may appear asymmetrically with respect to the symmetry axis of the face. In view of this, obtaining the quality distribution with respect to the three-dimensional data is advantageous in grasping the missing part of the three-dimensional data resulting from an improper face orientation. Thereby, registration or verification of authentication data in a less data missing condition can be carried out.

In the face authentication system, preferably, the quality rater rates the quality of the three-dimensional data, using a predetermined threshold value, and the quality distribution deriving section derives a localization degree with respect to a part of the face area where the quality of the three-dimensional data is rated to be low.

In the above arrangement, the quality of the three-dimensional data is rated in terms of binary data by using the predetermined threshold value. This enables to obtain the localization degree of the low quality part where the quality of the three-dimensional data is rated to be low, with respect to the face area. The localization degree changes depending on the face orientation. Specifically, as far as the face faces forward, the quality is distributed in such a manner that the central part of the face image has high quality, and a peripheral part thereof has substantially uniformly low quality. On the other hand, in the case where the face does not face forward, the low quality part locally appears at a peripheral portion of the face area. Thus, the arrangement is advantageous in easily and accurately grasping the missing condition of the three-dimensional data resulting from the face orientation or a like factor.

In the face authentication system, preferably, the quality rater rates the quality of the three-dimensional data in terms of a reliability value using a predetermined criterion, and the quality distribution deriving section derives a localization degree with respect to the face area to which the reliability value of the three-dimensional data is set. In this arrangement, the localization degree can be obtained in terms of the reliability value before binarization, unlike an arrangement of rating the quality of the three-dimensional data in terms of binary data. This arrangement enables to obtain the localization degree in a finer manner.

In the face authentication system, preferably, the quality distribution deriving section derives the localization degree in an axis direction corresponding to a transverse direction of the face of the subject. In use of the face template, three-dimensional data is likely missing in a condition that the face faces sideways, as compared with a condition that the face faces upward or downward. In other words, the data missing degree is large in the case where the cheeks having a larger gradient are displaced sideways with respect to the symmetry axis of the face, as compared with the case where the chin with a smaller area or the forehead with a relatively moderate slope is displaced. Accordingly, deriving the localization degree in the axis direction corresponding to the transverse direction of the face enables to efficiently and accurately rate the localization of the three-dimensional data missing part.

In the face authentication system, preferably, the processor includes a rating area specifying section for removing an area corresponding to a uniquely identifying portion of a living body from the face area to specify a rating area, and the quality distribution deriving section derives the localization degree with respect to the rating area. More preferably, the uniquely identifying portion of the living body is an area corresponding to the eyes and a moustache/beard of the subject.

The three-dimensional data may be missing, resulting from the unique configuration of the components of the living body. For instance, in case of using the aforementioned pattern light projection, specular reflection occurs with respect to the eye areas. As a result, the face authentication system fails to receive reflected light suitable for measurement from the eye areas. Also, since the surface configuration of the area where the moustache/beard is located is extremely complex, light reflected on the moustache area is likely to scatter. Accordingly, the face authentication system also fails to receive reflected light suitable for measurement from the moustache/beard area. Setting the rating area, with the area corresponding to the uniquely identifying portion of the living body being removed, is advantageous in more accurately grasping the missing condition of the three-dimensional data resulting from the face orientation or a like factor.

Preferably, the quality distribution deriving section derives the localization degree, based on a symmetry degree concerning a predetermined position of the face of the subject, as a reference. In this arrangement, the localization degree can be obtained, based on a judgment as to whether the quality of a data point pair at symmetrical positions is "high and high", "low and low", or "high and low", with respect to the centerline for dividing the face area into a right-side part and a left-side part, as the symmetry axis.

In the face authentication system, preferably, the processor includes a judging section for judging whether the registration process or the verification process is to be executed, based on a result on the quality distribution derived by the quality distribution deriving section. In this arrangement, in the case where the localization degree of the low quality part is judged to be lower than a predetermined reference value, as a result of deriving the quality distribution, the judging section judges that it is inappropriate to execute the registration process or the verification process. This enables to restrain registration of three-dimensional data having low reliability, or verification based on three-dimensional data having low reliability.

In the face authentication system, preferably, the judging section performs the judgment, based on a localization degree with respect to a part of the face area where the quality of the three-dimensional data is rated to be low, and a ratio of the part of the face area where the quality of the three-dimensional data is rated to be low relative to the face area. Even if the localization degree is judged to be in an allowable range, an unduly large ratio of the low quality part may lower the reliability in authentication, because of a reduced number of feature quantity in comparison. Accordingly, using the ratio of the low quality part relative to the face area, in addition to the localization degree of the low quality part, is advantageous in more accurately performing authentication.

In the face authentication system, preferably, the judging section generates and outputs a predetermined notification signal, if the judging section judges that the registration process or the verification process is not to be executed. More preferably, the face authentication system further comprises an audio output section for converting the notification signal into audio information to output the audio information, or a display section for converting the notification signal into image information to display the image information. These arrangements are advantageous in notifying the user via the audio information or the image information that the three-dimensional data obtained by the data input section is improper, or prompting the user to obtain three-dimensional data again.

In the face authentication system, preferably, the judging section generates and outputs a notification signal of prompting a user to change a condition for acquiring the three-dimensional data by the data input section, or a control signal for changing the condition for acquiring the three-dimensional data, if the judging section judges that the registration process or the verification process is not be executed. In this arrangement, in case where the acquired three-dimensional data is improper, the notification signal of prompting the user to change the condition for acquiring the three-dimensional data, or the control signal for changing the condition for acquiring the three-dimensional data is generated. This allows the user to re-execute the registration process or the verification process in a more advantageous condition.

A face authentication method according to another aspect of the invention includes: obtaining three-dimensional data concerning a face area of a subject; rating a quality of the three-dimensional data with respect to each of predetermined parts of the three-dimensional data; and obtaining a distribution of the quality with respect to the face area, based on a result on the quality obtained in the rating.

Preferably, the face authentication method further includes judging whether a registration process or a verification process of authentication data of the subject based on the three-dimensional data is to be executed, based on the result on the quality obtained in the rating.

A face authentication method according to yet another aspect of the invention includes: obtaining three-dimensional data concerning a face area of a subject; rating a quality of the three-dimensional data, using a predetermined threshold value, with respect to each of predetermined parts of the three-dimensional data; obtaining a localization degree with respect to a part of the face area where the quality of the three-dimensional data is rated to be low, based on a result on the quality obtained in the rating; and judging whether the localization degree lies in a proper range.

According to the face authentication system and the face authentication method of the invention, the quality data is generated by the quality rater with respect to each of the points constituting the three-dimensional data, and the quality distribution deriving section derives the distribution quality. In this arrangement, obtaining the localization degree with respect to the low quality part enables to easily and accurately grasp the missing condition of the three-dimensional data resulting from the face orientation or a like factor. Since the data quality can be accurately rated in registering or verifying the three-dimensional data, the arrangement is advantageous in performing a registration and an authentication with high precision.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A face authentication system, comprising:
    a data input section for obtaining three-dimensional data concerning a face area of a subject at multiple points; and
    a processor for performing a registration process or a verification process of authentication data of the subject based on the three-dimensional data,
    the processor including:
        a quality rater for rating a quality of the three-dimensional data with respect to a specified number of points of the three-dimensional data to generate quality data;
        a quality distribution deriving section for deriving a distribution of the quality with respect to the face area, based on the quality data; and
        a judging section for judging whether the registration process or the verification process is to be executed, based on a result on the quality distribution derived by the quality distribution deriving section, the judging section performing the judgment based on a localization degree with respect to a part of the face area where the quality of the three-dimensional data is rated to be low, and a ratio of the part of the face area where the quality of the three-dimensional data is rated to be low relative to the face area.

2. The face authentication system according to claim 1, wherein
    the quality rater rates the quality of the three-dimensional data, using a predetermined threshold value, and
    the quality distribution deriving section derives a localization degree with respect to a part of the face area where the quality of the three-dimensional data is rated to be low.

3. The face authentication system according to claim 1, wherein
    the quality rater rates the quality of the three-dimensional data in terms of a reliability value, using a predetermined criterion, and
    the quality distribution deriving section derives a localization degree with respect to the face area to which the reliability value of the three-dimensional data is set.

4. The face authentication system according to claim 2, wherein the quality distribution deriving section derives the localization degree in an axis direction corresponding to a transverse direction of the face of the subject.

5. The face authentication system according to claim 2, wherein
    the processor includes a rating area specifying section for removing an area corresponding to a uniquely identifying portion of a living body from the face area to specify a rating area, and
    the quality distribution deriving section derives the localization degree with respect to the rating area.

6. The face authentication system according to claim 5, wherein the uniquely identifying portion of the living body is an area corresponding to the eyes and a moustache/beard of the subject.

7. The face authentication system according to claim 2, wherein the quality distribution deriving section derives the localization degree, based on a symmetry degree concerning a predetermined position of the face of the subject, as a reference.

8. The face authentication system according to claim 1, wherein
    the judging section generates and outputs a predetermined notification signal, if the judging section judges that the registration process or the verification process is not to be executed.

9. The face authentication system according to claim 8, further comprising an audio output section for converting the notification signal into audio information to output the audio information.

10. The face authentication system according to claim 8, further comprising a display section for converting the notification signal into image information to display the image information.

11. The face authentication system according to claim 1, wherein the judging section generates and outputs a notification signal of prompting a user to change a condition for acquiring the three-dimensional data by the data input section, or a control signal for changing the condition for acquiring the three-dimensional data, if the judging section judges that the registration process or the verification process is not be executed.

12. A face authentication method, comprising:
    obtaining three-dimensional data concerning a face area of a subject;
    rating a quality of the three-dimensional data with respect to each of predetermined parts of the three-dimensional data;
    obtaining a distribution of the quality with respect to the face area, based on a result on the quality obtained in the rating; and
    judging whether a registration process or a verification process is to be executed, based on a result on the quality distribution, the judging being performed based on a localization degree with respect to a part of the face area where the quality of the three-dimensional data is rated to be low, and a ratio of the part of the face area where the quality of the three-dimensional data is rated to be low relative to the face area.

* * * * *